United States Patent
Vempati

(12)
(10) Patent No.: US 6,444,186 B1
(45) Date of Patent: Sep. 3, 2002

(54) COMPOSITION AND METHOD OF FORMING LOW-CARBON, AMORPHOUS SILICEOUS ASH FROM SILICEOUS WASTE MATERIAL

(75) Inventor: Rajan K. Vempati, Dallas, TX (US)

(73) Assignee: ChK Group, Inc., Dallas, TX (US)

( * ) Notice: Subject to any disclaimer, the term of this patent is extended or adjusted under 35 U.S.C. 154(b) by 0 days.

(21) Appl. No.: 09/493,924

(22) Filed: Jan. 28, 2000

(51) Int. Cl.$^7$ ................................................ C01B 33/12
(52) U.S. Cl. ........................................ 423/335; 501/154
(58) Field of Search .......................... 423/335; 501/133, 501/154

(56) References Cited

U.S. PATENT DOCUMENTS

| | | | |
|---|---|---|---|
| 3,125,043 A | * | 3/1964 | Gravel |
| 3,626,876 A | | 12/1971 | Gardner |
| 3,959,007 A | | 5/1976 | Pitt |
| 4,049,464 A | * | 9/1977 | Tutsek et al. |
| 4,105,459 A | * | 8/1978 | Mehta |
| 4,488,908 A | * | 12/1984 | Goodwin et al. |
| 4,512,267 A | | 4/1985 | Cegielski, Jr. et al. |
| 4,571,389 A | | 2/1986 | Goodwin et al. |
| 4,829,107 A | * | 5/1989 | Kindt et al. |
| 5,329,867 A | | 7/1994 | Sugita |

FOREIGN PATENT DOCUMENTS

| | | | |
|---|---|---|---|
| EP | 674 605 B | * | 12/1997 |
| GB | 2106087 A | * | 4/1993 |
| JP | 05-194007 A | * | 8/1993 |
| JP | 07-196312 A | * | 8/1995 |

* cited by examiner

*Primary Examiner*—David Sample
(74) *Attorney, Agent, or Firm*—Bracewell & Patterson, LLP

(57) ABSTRACT

The present invention is a method of manufacturing low carbon content (hence, an off-white color), amorphous (non-crystalline) siliceous ash from ordinary siliceous waste materials such as, for example, rice hulls, and plant residues from biogas generation. A portion of plant waste materials is pyrolyzed in a furnace such as a tube furnace. Next, the material is pyrolyzed in a tube furnace at a temperature of between about 500 and 800° C. for at least 0.5 hours to 3 hours. Simultaneous to the pyrolysis, a continuous stream of air is passed over the material, and gaseous products from the pyrolysis are drawn off. The siliceous ash is thus formed.

21 Claims, 5 Drawing Sheets

COMPOSITION AND METHOD OF FORMING LOW-CARBON, AMORPHOUS SILICEOUS ASH FROM SILICEOUS WASTE MATERIAL

CROSS-REFERENCE TO RELATED APPLICATION

The present application is related to application Ser. No. 09/493,923, now U.S. Pat. No. 6,368,571, entitled "ZSM-5 Made from Siliceous Ash" by inventor Rajan K. Vempati filed concurrently with the present application, herein incorporated by reference.

BACKGROUND OF THE INVENTION

1. Field of the Invention

The present invention relates in general to the production of amorphous, low-carbon content (hence, off-white in color) siliceous ash from, e.g., rice hulls and other siliceous waste materials. More particularly, the present invention relates to a method of producing a low-carbon content, amorphous siliceous ash that is suitable to form zeolites structures and high-performance cement, and a composition of siliceous ash thereof.

2. Description of the Prior Art

Siliceous waste materials from agricultural products, especially rice hulls, can be used for a variety of applications. However, processing of the siliceous waste material is typically necessary to enhance its physical and chemical properties. The silicon, typically in the form of silicon dioxide ($SiO_2$), derives from the cell structure of plant material. Rice hulls, for example, are generally found to have about 20% $SiO_2$ by weight. Given the industrial sources and nature of carbon thermal treatment, there are differences in carbon content and forms of carbon (i.e., graphitic or amorphous), and thus a need for purification of the $SiO_2$ from the raw siliceous waste materials such as rice hulls that retains the mineralogy of the amorphous $SiO_2$.

The disposition of siliceous waste materials such as rice hulls has become a substantial problem in the agricultural industry in that rice hulls typically can only be disposed of by burning or burying. This presents environmental problems, as landfilling is limited, and burning the waste material in an uncontrolled manner is both wasteful and presents undesirable pollutants. Additionally, the presence of crystalline $SiO_2$, e.g., quartz, cristobalite, may also pose a health hazard such as silicosis. Some potential uses for the $SiO_2$ in plant matter could be used as pozzolan in cement, or use as a catalytic matrix such as zeolites.

When heating or pyrolyzing $SiO_2$, there is a transition from an amorphous, non-crystalline form of material to a crystalline form know as tridymite and cristobalite. This takes place at a high temperature, such as 800° C. to 1000° C., for pure $SiO_2$, and lower temperatures for impure $SiO_2$, such as found in rice hulls and other silicon-containing plant waste. The crystallized form of $SiO_2$ is not reactive, and hence, less useful as an end product than the amorphous form of $SiO_2$. Retention of plant amorphous $SiO_2$ is thus favorable. However, given the presence of carbon in the plant cell matrix in, for example, rice hulls, the conversion to purely low-carbon, off-white, amorphous $SiO_2$ is difficult.

It has been discovered that a highly useful amorphous form of $SiO_2$ may be produced by the careful, controlled incineration of rice hulls at relatively low temperatures and oxidizing atmospheres. Goodwin et al. (U.S. Pat. No. 4,571,389) disclose a method of making silicate aggregate, wherein rice hull ash with a carbon content of no more than 4% is reacted with boric acid, an alkali metal hydroxide in aqueous solution and heated. The result is a silicon-based aggregate useful as a sorbent. Sugita (U.S. Pat. No. 5,329,867) discloses a method of making an activated rice hull ash using a rotary-type kiln that allows for continuous air purging from the bottom of the reactor. Pitt (U.S. Pat. No. 3,959,007) discloses a method and apparatus for converting rice hulls to a highly amorphous form of $SiO_2$ or rice hull ash. The apparatus disclosed by Pitt comprises a complex circular furnace wherein the introduced rice hulls are pyrolyzed to a temperature of up to 1300° F., a flow of air causing a helical movement of the rice hull particles as they are pyrolyzed. A low-carbon content rice hull ash is obtained when the rice hulls are heated for 66 hours at 1100° F. (ca. 600° C). Given the complexity of this method and the high energy requirements (high temperature for prolonged periods of time), it is desirable to improve upon this method of forming a low-carbon content (hence, off-white) amorphous siliceous ash.

SUMMARY OF THE INVENTION

It is therefore an object of the present invention to provide a method of producing low-carbon content (0 to 3% by weight), and hence an off-white color, siliceous ash, the primary starting material for the ash being silicon-containing (siliceous) waste material.

It is another object of the present invention to provide a siliceous ash that can be used in cement, and as a filler in polymer compositions.

It is yet another object of the present invention to provide a siliceous ash that will improve the durability and strength of cement compositions.

It is yet another object of the present invention to provide a siliceous ash that is pure enough to be used in the synthesis of zeolites as catalysts.

It is yet another object of the present invention to provide a method of using siliceous waste material in a cost-added product, thus improving ecological problems caused by the landfilling and/or incineration of siliceous waste materials.

It is yet another object of the present invention to provide a method of producing siliceous ash from siliceous waste material, wherein the carbon content can be varied from 0% to 3% or more by weight of the ash. Further, it is an object to provide ash having amorphous carbon.

These objects are achieved by providing a method of producing low-carbon, amorphous siliceous ash from siliceous waste material, wherein a portion of waste materials is pyrolyzed in a furnace. The waste materials can be such things as rice hulls and other plant waste materials, including siliceous rice hull residue derived from bio-gas generation, and other sources of amorphous $SiO_2$. One such furnace that can be used is a tube furnace, but other furnaces would also be suitable. For purposes of illustration, a tube furnace is described in FIG. 1, and the method of the invention is described with reference to a tube furnace. It is to be understood that any furnace having a known volume is suitable. The material is pyrolyzed in a tube furnace at a temperature of between about 500° C. and 800° C. for at least 0.5 to 6 hours or more. Simultaneous to the pyrolysis, a continuous stream of air is passed over the material, and gaseous products from the pyrolysis are drawn off. The siliceous ash is thus formed. The furnace can be provided with a means of continuously feeding siliceous waste material into the furnace, and conveying the siliceous ash out of the furnace.

The ratio of the weight of the portion of plant waste material to the volume of the tube furnace should be maintained at between about 0.02 and 0.10. Further, the siliceous ash product may have a carbon content of between about 0% and 3% by weight or more of the siliceous ash and a $SiO_2$ content of at least 94% by weight of the siliceous ash.

Additional objects, features and advantages will be apparent in the written description which follows.

DETAILED DESCRIPTION OF THE INVENTION

Figure 1:
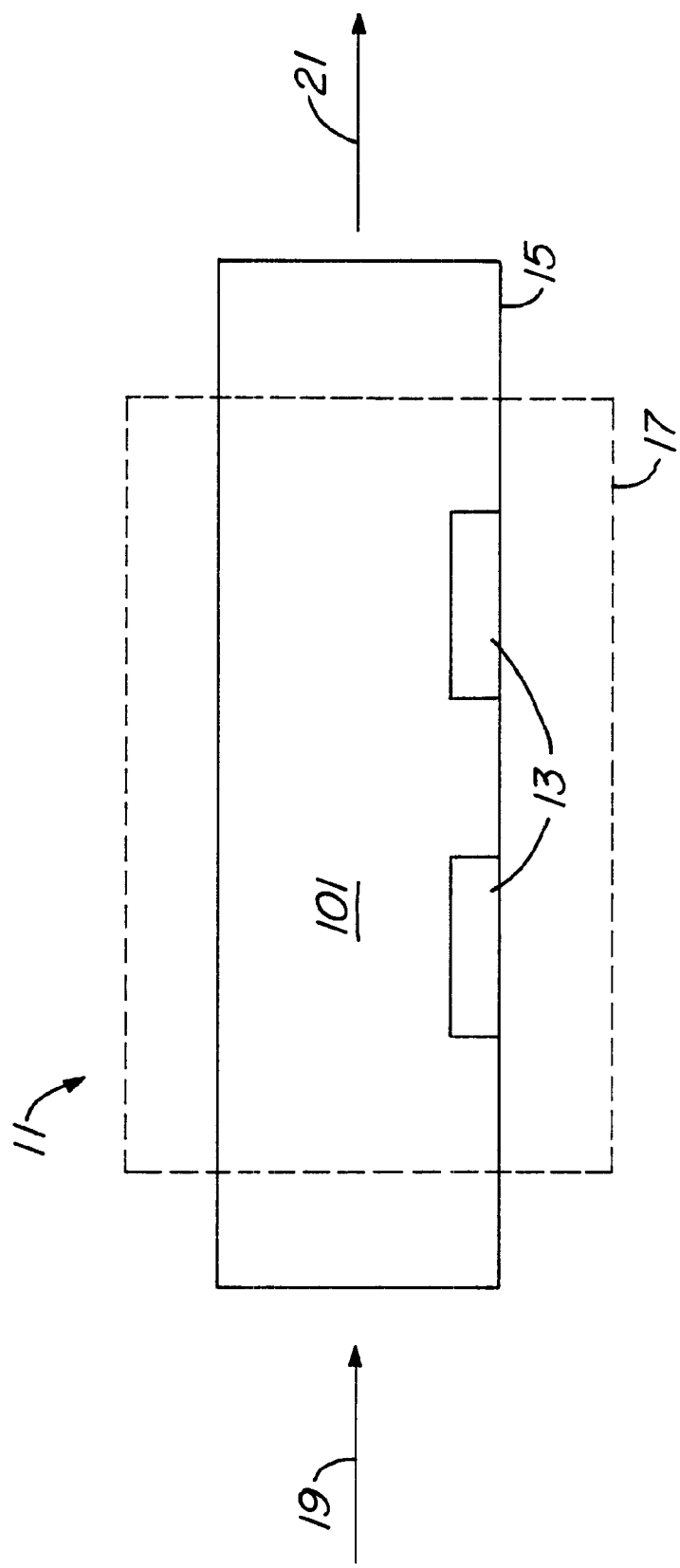
FIG. 1 is a schematic diagram of the furnace design used in the method of the invention.

The present invention is a method of manufacturing low-carbon content (hence, an off-white color), amorphous (non-crystalline) siliceous ash from ordinary siliceous waste materials such as, for example, rice hulls. The waste materials can be such things as rice hulls and other plant waste materials, geothermal sludge, and other sources of amorphous $SiO_2$ or alumino-silicate such as fly ash and similar products from the combustion of fossil fuels. By low-carbon, it is meant that the carbon content in the ash is between about 0% and 3% by weight of total ash. The prior art discloses methods of making rice hull ash that is useful as a sorbent or cement. However, these methods are complex, and often leave an undesirable amount of carbon in the ash, thus decreasing its utility. The present method involves the heating (pyrolysis) of such siliceous waste materials as common rice hulls having from 20–30% $SiO_2$ content under certain conditions. In particular, the volume of the furnace used to pyrolyze the siliceous waste materials should be large enough relative to the amount of material added to allow nearly complete combustion of the carbon in the rice hulls to carbon monoxide and/or carbon dioxide. Further, there is a need for the passage and mixing of air, or oxygen enriched atmosphere, to enhance the combustion of the carbon and release as carbon monoxide and/or carbon dioxide.

The method of producing low-carbon, amorphous siliceous ash from siliceous waste materials comprises several steps. First, a know portion of siliceous waste materials of a known weight may be either ground to a particular particle size range, or obtained pre-ground, as is often the case when received at an incineration site. Optionally, the sample used can be ground after pyrolysis. Thus, particle size is not important in the pyrolysis step of the invention. Grinding can be accomplished by standard means known to those skilled in the art.

Next, the ground or un-ground siliceous waste materials is pyrolyzed at a temperature of between 500–800° C. for at least 0.5 to 6 hours or more while simultaneously passing a continuous stream of air over the portion of rice hulls, thus forming siliceous ash. In one specific embodiment, the temperature is kept at 600° C. Pyrolyzing at 600° C. for 1.5 hours will typically produce ash with a carbon content of about 3% by weight of total ash. If heated at the same temperature for longer periods of time, such as 3 hours or longer, the carbon content can be reduced to less than 1%. The pyrolysis can be done in a tube or muffle furnace, wherein air or oxygen enriched air can be made to flow over the sample, and gaseous products from the pyrolysis reaction can be removed by vacuum or other devices. It is to be understood that any furnace having a known volume can be used in the method of the invention. Further, it is preferable to agitate the sample by mechanical and/or fluidized bed processes. While tube or muffle furnaces accomplish the method of forming the rice hull ash of the invention, it should be understood that other means of pyrolyzing the rice hulls can be used.

Whatever means is used to perform the pyrolysis, the ratio of the siliceous waste materials weight (grams) to the volume of the tube furnace ($cm^3$) should be kept to between approximately 0.02 to 0.10, and preferably between 0.02 and 0.05. The volume of the tube furnace is the internal volume of the portion of the furnace in which the siliceous material is held and pyrolysis occurs, inlet gases flowing throughout the volume and exiting the furnace along with gases produced from the pyrolysis. This volume may vary considerably depending on the size and type of furnace used. The invention is in no way limited to a furnace with a specific volume; only the ratio of the volume to siliceous waste material is considered. This ratio can be increased by drawing the gaseous product out of the chamber by vacuum or low pressure created to draw gases from the furnace. The pyrolysis under these conditions results in a siliceous ash having a carbon content of less than 1% by weight of the siliceous ash and a $SiO_2$ content of greater than 94% by weight of the rice hull ash. Lower temperature or less pyrolysis time will result in a larger amount of amorphous carbon, which may be advantageous for some applications. Typically, the siliceous ash has a density in the range from approximately 2.0 $g/cm^3$ to 2.3 $g/cm^3$. Also, particles of siliceous ash are typically of a size substantially between 10–100 $\mu m$, either from a pre-grinding step or post-grinding step. Finally, the $SiO_2$ in the siliceous ash is substantially amorphous as shown in analytical studies discussed below.

Although the production of low-carbon siliceous ash is described, a siliceous ash with a carbon content of between about 0 and 3% or higher is also desirable in some cases. This is in case a support matrix for amorphous carbon is desirable. This is accomplished by decreasing the pyrolysis temperature and/or decreasing the pyrolysis time. Further, the ratio of weight of siliceous ash to furnace volume can be increased.

Another aspect of the invention is the amorphous state of the carbon in the ash. There are two forms of carbon. Graphitic (which is a crystalline form) and amorphous. Typically, commercial rice hull ash and other siliceous ash contains graphitic carbon. It is difficult to remove the graphitic form of carbon either by pyrolysis or chemical treatment. However, pyrolysis will remove amorphous carbon. Thus, an advantage of the present invention is to allow varying amounts of amorphous carbon to be present in the siliceous ash for a desired purpose. For example, the presence of amorphous carbon in the siliceous ash enhances the absorption capacity of the ash. Also, the material can be substituted where activated carbon cannot be used such as hydrated or humid environments.

EXAMPLE 1

The silicon-containing siliceous waste material used in the Examples to follow is unprocessed rice hulls. A sample of ground rice hulls came from Busch Agricultural Resources, Inc. The rice hulls contained the following particle sizes: 12.78% of greater than 850 μm, 64.4% of 300–850 μm, 12.7% of 180–300 μm, and 9% less than 180 μm. The rice hulls were pyrolyzed in a tube furnace of 2.2 cm diameter and 12 cm length. FIG. 1 shows a schematic diagram of the tube furnace used in the invention. Furnace 11 contains two ceramic boats 13 that hold the samples to be pyrolyzed. The boats are placed in the furnace portion 15, the furnace portion having a volume 101, and supplying heat from heating unit 17 which surrounds the furnace. Optionally, the boats may be coupled to a conveyer means, whereby siliceous waste material can be conveyed into the furnace, and completely pyrolyzed ash can be conveyed out of the furnace. Air flows into the furnace as indicated by flow 19, and out of the furnace as indicated by flow 21. Typically, the resultant gas from the pyrolysis of siliceous waste materials is carbon monoxide or carbon dioxide, the source of carbon from the carbon monoxide or carbon dioxide being the carbon in the siliceous waste material.

In Example 1, two ceramic boats were placed in the furnace, each with one gram of sample. The samples were pyrolyzed for 3 hours at 600° C. The yield of rice hull ash after pyrolysis was 0.14 g per boat. Air was allowed to flow though the tube furnace and over the samples, and gases generated from pyrolysis are drawn off continuously.

EXAMPLE 2

A sample of ground rice hulls came from Busch Agricultural Resources, Inc. The rice hulls contained the following particle sizes: 12.78% of greater than 850 μm, 64.4% of 300–850 μm, 12.7% of 180–300 μm, and 9% less than 180 μm. The particles were placed in a tube furnace, wherein the particle weight to furnace volume ratio was 0.05. While heating the sample, there was a continuous purge of air. After pyrolysis in a tube furnace as described above for 1.5 hours at 600° C., the following particle sizes resulted: 2% particles less than 10 μm, 22% in the range of 15 to 30 μm, and 76% in the range of 30 to 90 μm. The particle density was 2.14 g/cm$^3$, with a surface area of 35 m$^2$/g. Below in Table 1 is the chemical composition of selected oxides in the rice hull (siliceous) ash from Example 2. For comparison, Table 1 also shows a commercially available rice hull ash ARHA composition containing graphitic carbon.

TABLE 1

Chemical Composition by Percent Weight of Total Composition of the Selected Oxides Present in the Siliceous Rice Hull Ash of Example 2 and Comparison to Commercial Siliceous Ash.

| Element | Commercial Ash (ARHA)[1] % | Example 2[2] % |
|---|---|---|
| $SiO_2$ | 92.0 | 94.80 |
| $Al_2O_3$ | 0.50 | 0.52 |
| Alkalis | 2.3 | 2.92 |
| C | 2.5 | 0.24 |
| $P_2O_5$ | — | 1.09 |
| $Fe_2O_3$ | 0.20 | 0.13 |
| MgO | 0.20 | 0.39 |

[1]ARHA, a commercial rice hull ash, provided by Agrilectric Power, Inc.
[2]Rice hull ash pyrolyzed at 600° C. for 1.5 hours.

Thermogravimetric analysis of the siliceous ash of Example 2 shows a weight loss of 0.89% after heating at 600° C. for 1.5 hours (RHA1.5), and a weight loss of 2.28% after heating for 3 hours at the same temperature. These data indicate that the loss of ignition is low compared to rice hulls before processing, thus suggesting that there is almost complete removal of the carbon.

Figure 2A:
FIG. 2A is a micrograph of a siliceous rice hull ash of the invention resulting from scanning electron microscopy.
Figure 2B:
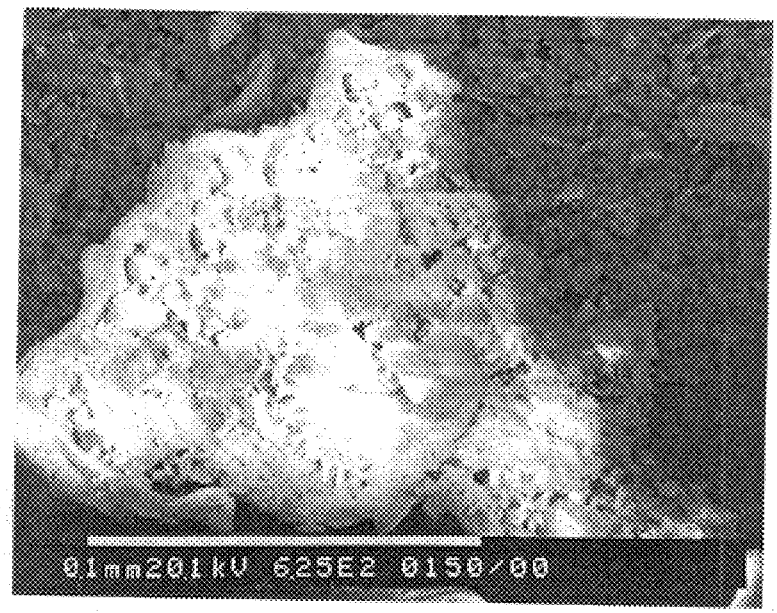
FIG. 2B is another micrograph of a siliceous rice hull ash of the invention.

Scanning electron microscopy images showed particle sizes of different morphologies. These data are shown in FIG. 2A and FIG. 2B. These results show that the rice hull ash in the examples has a morphology that is featureless or non-photogenic. This is consistent with the siliceous rice hull ash having $SiO_2$ that is amorphous.

Figure 3:
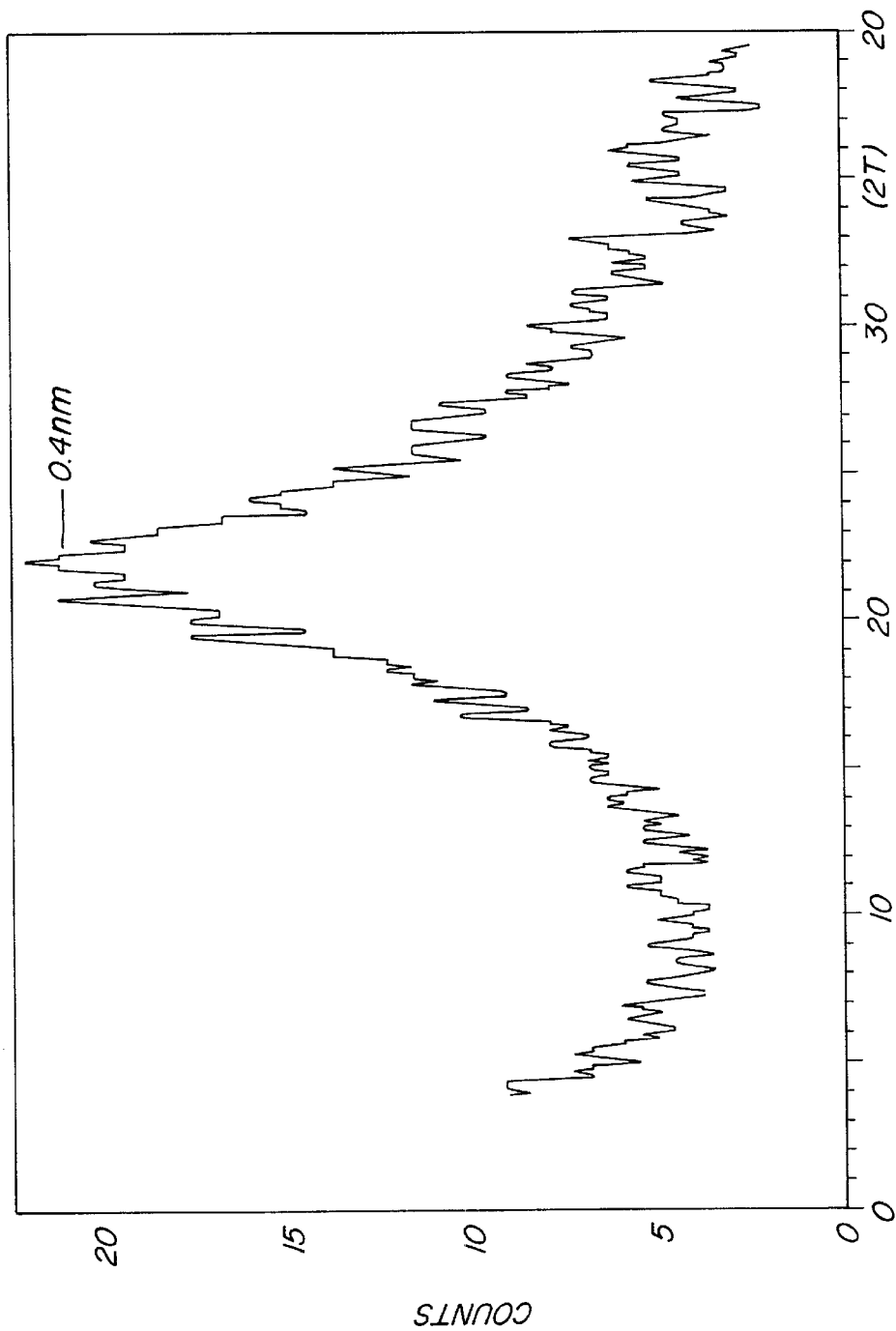
FIG. 3 is a X-Ray diffraction pattern of the siliceous rice hull ash of the invention.

Other data is also consistent with the siliceous rice hull ash being amorphous. FIG. 3 shows the X-Ray diffraction pattern of the siliceous rice hull ash sample. The data indicate that the $SiO_2$ in the sample is substantially amorphous. Specifically, these data show that no crystalline material is observed in the pyrolyzed rice hulls of the invention, thus the $SiO_2$ is amorphous.

Figure 4:
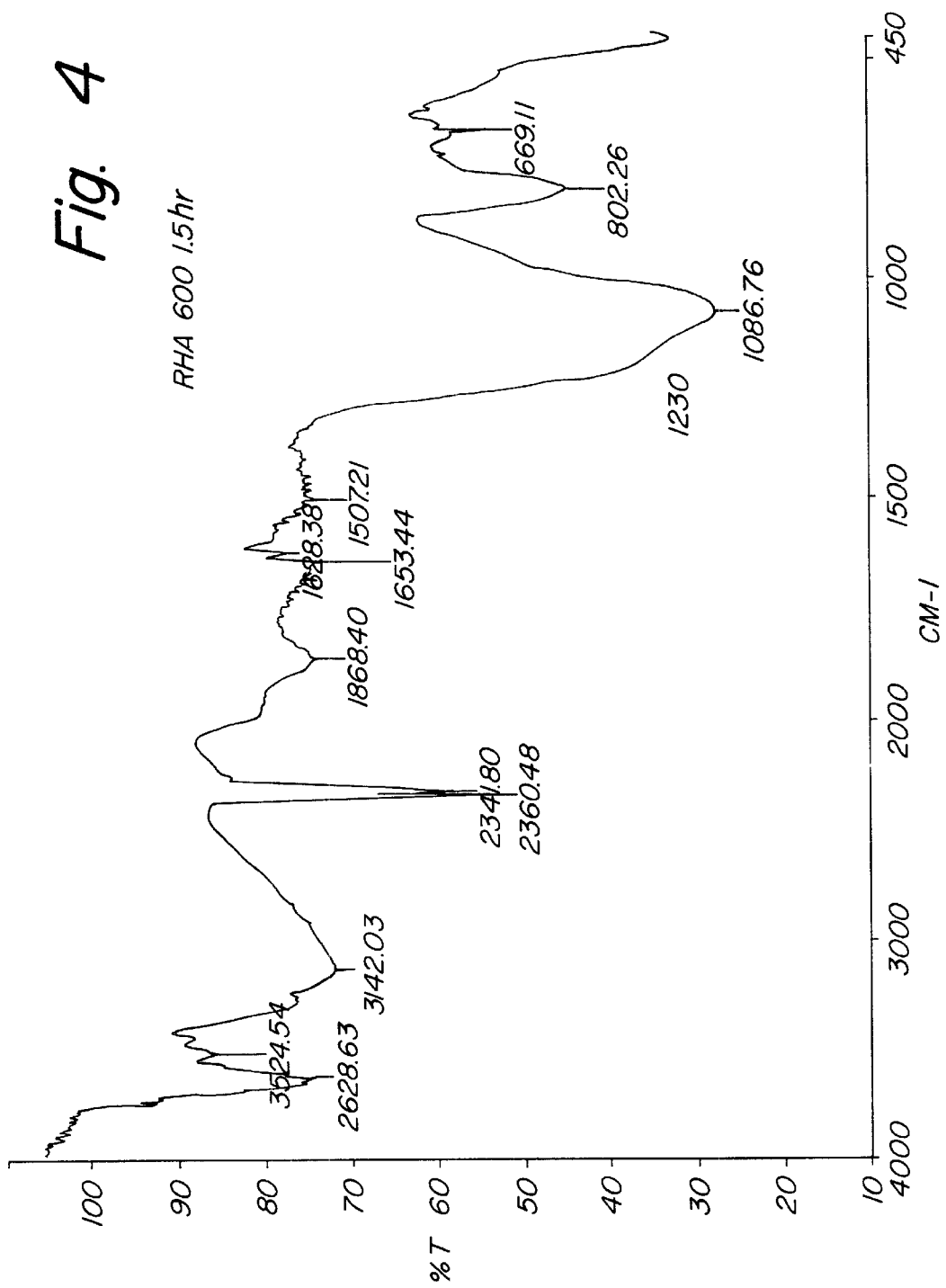
FIG. 4 is a Fourier Transform Infra Red Spectrum of the siliceous rice hull ash of the invention.

Infra-red vibrational and stretching frequencies are also a characteristic that can be used to characterize siliceous samples. FIG. 4 shows a FTIR of the Example 2 sample, wherein the asymmetric Si—O vibration modes were observed at 1230 and 1080 cm$^{-1}$, and symmetric Si—O vibration modes were observed at 810 and 669 cm$^{-1}$, respectively. These observed vibrational modes are consistent with amorphous $SiO_2$.

EXAMPLE 3

Figure 5:
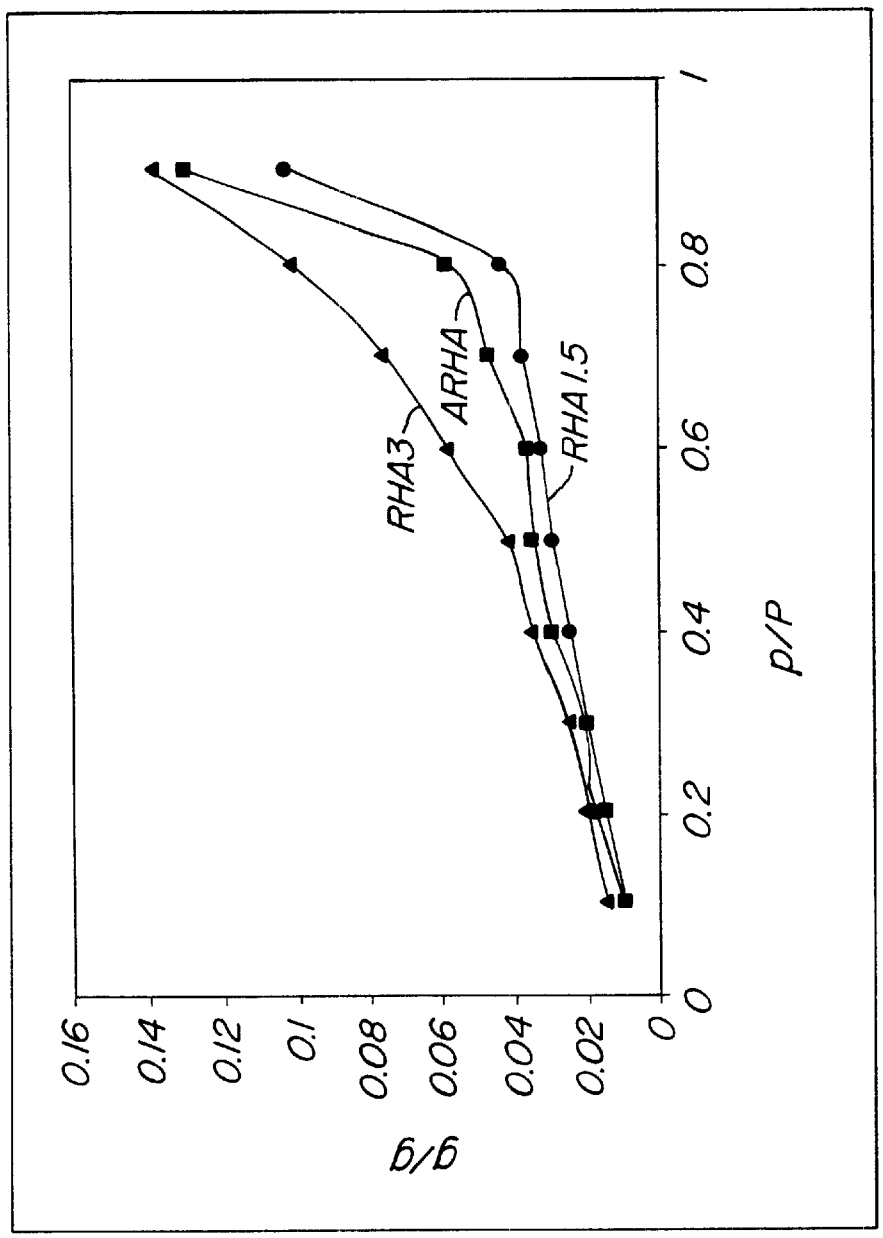
FIG. 5 is a water adsorption isotherm of the siliceous rice hull ash of the invention.

Three samples of the rice hull ash of the invention were tested for their hydrophobicity characteristics. The samples were ARHA (Agrilectric Rice Hull Ash of 31 m$^2$/g), RHA3 (35 m$^2$/g sample pyrolyzed for 3 hours at 600° C.), and RHA1.5 (38 m$^2$/g sample pyrolyzed for 1.5 hours at 600° C.). FIG. 5 shows a water adsorption isotherm of the rice hull ash of the invention. The rice hull ash exhibited Type V water adsorption isotherms. Specifically, the curves in FIG. 5 show that the RHA1.5 is more hydrophobic than the commercial RHA which contained graphitic carbon or the RHA3.0. The hydrophobicity observed in these samples is likely due to the presence of amorphous carbon and/or siloxane present on the rice hull ash particle surfaces.

The siliceous ash of the present invention has several advantages. It can replace 10 to 20% of cement when used as a pollozan. This is important since cement is an energy intensive material. Further, it will reduce the heat of hydration and hence, prevent cement from cracking while curing.

The present siliceous ash generated from siliceous waste material, when used in cement, will lower the permeability of the cement and enhance its freeze/thaw durability. The siliceous ash of the present invention can be used in high performance concrete for highway decks, marine structures, petrochemical industries and wastewater industries where highly corrosive conditions exist. It can be used as a high-performance cement as well.

Due to the low-carbon content, hence, light off-white color, the siliceous ash of the present invention can be used not only in cement, where a white color is ideal, but also as fillers in polymers such as polypropylene and rubber. Further, it can be used in electronics industries, ceramics, silane manufacturing by and chemically treating the ash with, e.g. $HNO_3$, $H_2SO_4$, and $HClO_4$ to completely remove carbon.

The method of manufacturing the siliceous ash of the present invention has many advantages over the prior art. The present method is more economical as it takes less time and hence less energy to produce.

Another advantage is that the carbon in the ash is amorphous, which thus allows it to be removed in subsequent use such as in zeolite materials. Further, the amount of amorphous carbon can be varied. This allows a larger amount of carbon to be present when a hydrophobic ash is desired.

While the invention has been shown in only one of its forms using rice hull, it is not thus limited to rice hulls but also other silicon-containing plant waste including siliceous residue from bio-gas generation. Also, the siliceous source can be alumino-silicates such as fly ash products. Further, the method of producing the ash is susceptible to various changes and modifications without departing from the spirit thereof.

What is claimed is:

1. A method of producing low carbon, amorphous siliceous ash from siliceous or alumino-silicate waste materials, the method comprising:
   providing a portion of siliceous waste materials;
   pyrolyzing the siliceous waste materials at a temperature of between about 500 and 800° C. for at least 0.5 hours while simultaneously agitating the portion of siliceous waste materials;
   simultaneous to the pyrolysis, passing a continuous stream of air over the portion of siliceous waste materials, and drawing away gaseous products formed from the pyrolysis, thus forming siliceous ash;
   wherein the siliceous ash has a carbon content of between about 0 and 3 percent by weight of the siliceous ash and a $SiO_2$ content of greater than 94 percent by weight of the siliceous ash.

2. The method of claim 1, wherein the $SiO_2$ in the siliceous waste material is amorphous.

3. The method of claim 1, wherein the siliceous waste materials are pyrolyzed in a furnace and wherein the ratio of the weight of siliceous waste materials to the volume of the furnace is between about 0.02 and 0.10.

4. The method of claim 1, wherein the siliceous waste materials are pyrolyzed in a furnace and wherein the furnace is provided with a continuous feed means whereby siliceous waste material can be conveyed into the furnace, and completely pyrolyzed ash can be conveyed out of the furnace.

5. The method of claim 1, wherein the siliceous ash has a density in the range from approximately 2.0 g/cm$^3$ to 2.3 g/cm$^3$.

6. The method of claim 1, where in the $SiO_2$ in the siliceous ash is amorphous.

7. The method of claim 1, wherein the carbon in the siliceous ash is amorphous.

8. The method of claim 1, wherein pyrolysis of the siliceous waste material for 1.5 hours at about 600° C. produces ash with 3 percent carbon by weight of ash.

9. The method of claim 1, wherein pyrolysis of the siliceous waste material for at least 3 hours at about 600° C. produces ash with a carbon content of between about 0 percent and 1 percent by weight of ash.

10. A method of producing low-carbon, amorphous siliceous ash from siliceous or aluminosilicate waste material, the method comprising:
    providing a portion of siliceous waste materials;
    pyrolyzing the siliceous waste materials in a tube furnace at a temperature of between about 500 and 800° C. for at least 0.5 hours;
    simultaneous to the pyrolysis, passing a continuous stream of air over the portion of siliceous waste material and drawing off gaseous products from the pyrolysis, thus forming
    wherein the ratio of the weight of the siliceous waste material to the volume of the tube furnace is between about 0.02 and 0.10; and
    wherein the siliceous ash has a carbon content of between about 0 and 3 percent by weight of the siliceous ash and a $SiO_2$ content of greater than 94 percent by weight of the siliceous ash.

11. The method of claim 10, wherein the $SiO_2$ in the siliceous waste material is amorphous.

12. The method of claim 10, wherein the siliceous ash has a density in the range from approximately 2.0 g/cm$^3$ to 2.3 g/cm$^3$.

13. The method of claim 10, wherein the siliceous waste materials is agitated simultaneously with pyrolysis.

14. The method of claim 10, wherein the furnace is provided with a continuous feed means whereby siliceous waste material can be conveyed into the furnace, and completely pyrolyzed ash can be conveyed out of the furnace.

15. The method of claim 10, wherein the siliceous ash is ground to a particle size of between about 10–100 μm.

16. The method of claim 10, wherein the $SiO_2$ in the siliceous ash is amorphous.

17. The method of claim 10, wherein the carbon in the siliceous ash is amorphous.

18. The method of claim 10, wherein pyrolysis of the siliceous waste material for 1.5 hours at about 600° C. produces ash with 3 percent carbon by weight of ash.

19. The method of claim 10, wherein pyrolysis of the siliceous waste material for at least 3 hours at about 600° C. produces ash with a carbon content of between about 0 percent and 1 percent by weight of ash.

20. A low-carbon, amorphous siliceous ash composition derived from siliceous waste material comprising:
    particles of a size substantially between about 10–100 μm;
    wherein the $SiO_2$ content of the particles is greater than 94 percent by weight of the particles;
    and wherein the carbon content of the particles is between about 0 and 3 percent by weight of the particles;
    and wherein the $SiO_2$ and carbon are amorphous.

21. The composition of claim 20, wherein the siliceous ash particles have a density in the range from approximately 2.0 g/cm$^3$ to 2.3 g/cm$^3$.

* * * * *